UNITED STATES PATENT OFFICE.

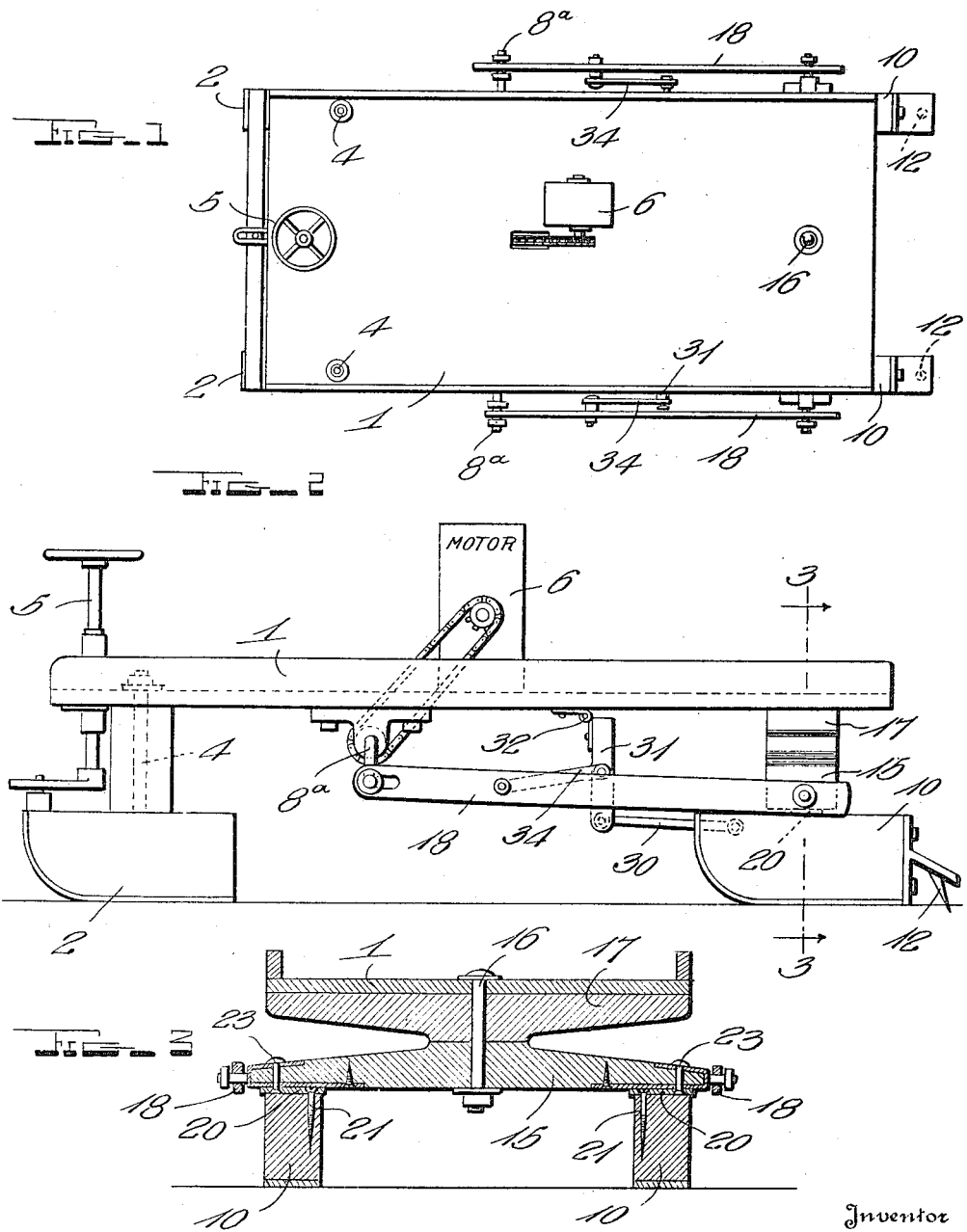

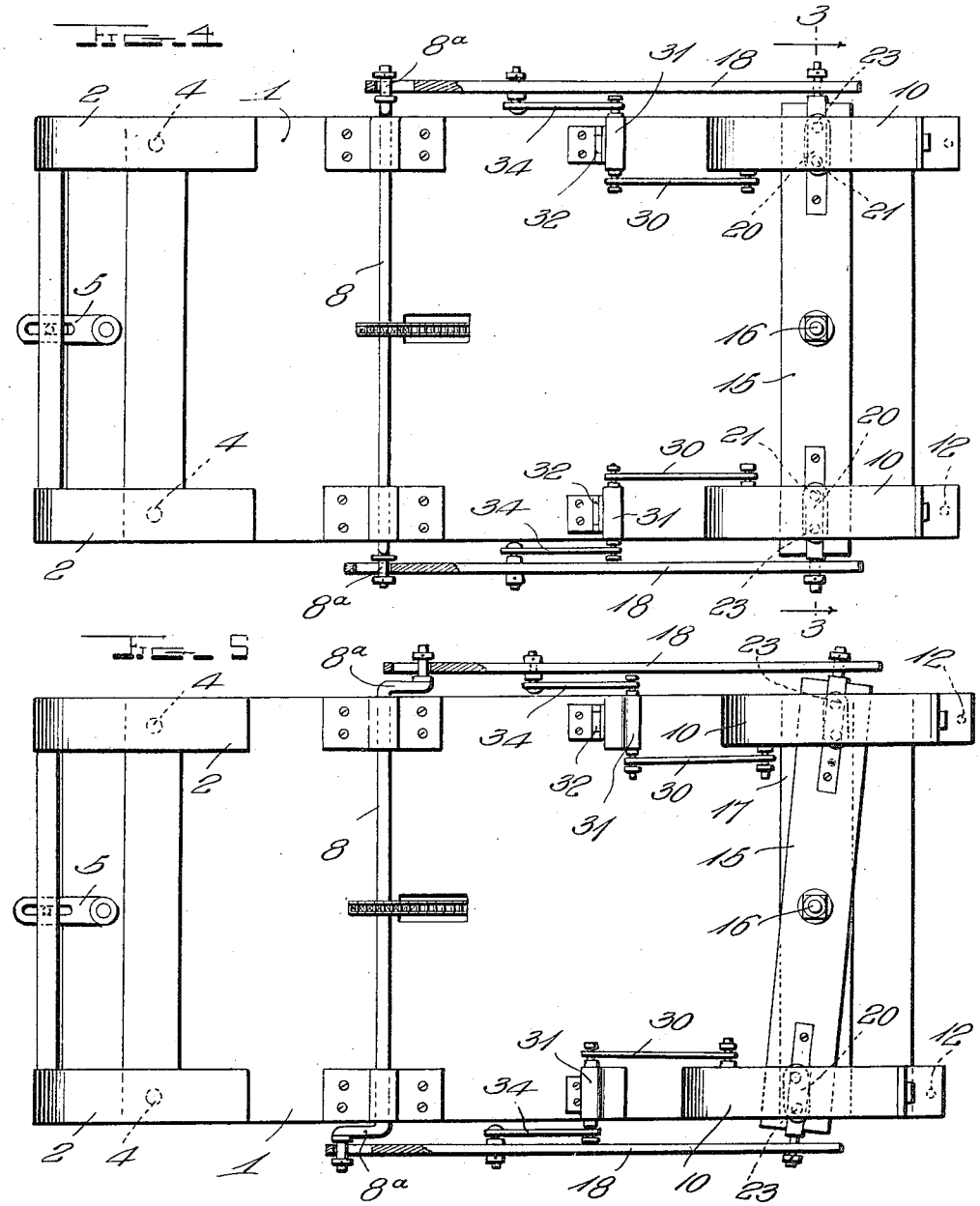

OLAI FLADELAND, OF POPLAR, MONTANA.

MOTOR-SLEIGH.

1,266,442.

Specification of Letters Patent.    Patented May 14, 1918.

Application filed May 23, 1917. Serial No. 170,402.

*To all whom it may concern:*

Be it known that I, OLAI FLADELAND, a citizen of the United States, residing at Poplar, in the county of Sheridan and State of Montana, have invented certain new and useful Improvements in Motor-Sleighs, of which the following is a specification.

My invention relates to motor sleighs and resides in means for propelling the vehicle by the alternate advance of the rear runners.

One of the objects of my invention is to provide a substantially parallel reciprocating movement of the rear runners. Another object is to provide connecting mechanism between the rear runners and the drive shaft that will effectively transmit the reciprocating motion to opposite sides of the runners.

The manner in which these objects are attained will be understood from the following description in connection with the accompanying drawings in which—Figure 1 is a top plan view of a motor sleigh embodying my invention; Fig. 2 is a side elevation of the same; Fig. 3 is a cross section on the line 3—3 of Fig. 2; and Figs. 4 and 5 are bottom plan views.

The platform 1 may be provided with a top or body of any shape or style desired. The front runners 2 are pivotally mounted upon bolts 4 or in any suitable manner so that they may be oscillated to guide the vehicle by suitable steering mechanism indicated conventionally at 5.

The sleigh is propelled by a suitable motor 6, connected with the crank-shaft or power shaft 8. The rear runners 10 are alternately advanced to propel the sleigh and are provided with a prong or spike 12, to strike into the snow and ice, furnishing an anchorage for the runner as it is pushed backwardly.

The rear axle 15, to which the rear runners 10 are connected, is pivoted on the king-bolt 16, which is secured in the bolster 17. The axle is oscillated about the king-bolt by means of the connecting rods 18, connected to the cranks 8ª on the ends of the power-shaft 8.

One of the important features of my invention resides in the manner of connecting the runners 10 with the oscillatory axle and with the power shaft so that the alternating advance motion of the runners shall be in alinement with the forward motion of the vehicle without any lateral shifting motion. In order that the oscillating axle 15 may change its angular relation with respect to the runners, I pivotally attach a link-plate 20 to the top of the runner by a screw or bolt 21 located adjacent the inner side of the runner, and pivot this link-plate to the axle adjacent the outer side of the runner by a bolt 23. By referring to the different positions of the axle in Figs. 4 and 5, it will be seen that this link-plate connection between the runner and the axle permits the latter to constantly vary its angular relation while permitting the runner to oscillate forwardly and backwardly without any lateral shifting.

In order to maintain the parallel movement of the runners and their rectilinear movement with respect to the vehicle as they are alternately moved forward, I connect the inner side by a link 30 to a rock-lever 31 hinged at 32 to the under side of the vehicle body. The proper oscillatory movement is imparted to the rock-lever in unison with the oscillation of the rear axle, by a link 34, connected to the connecting rod 18. It will be observed that there is a simultaneous pull or push exerted upon opposite sides of each runner by the connecting rod acting through the axle and link-plate 20, and by the link 30, the link-plate 20 permitting the runner to remain in alinement with the direction of travel without any lateral shifting movement.

At each alternate oscillatory movement of the rear axle, one of the runners is moved forward or advanced, while the rearward pressure upon the other runner drives the spike into the ice, snow or ground, thereby anchoring the runner and compelling the vehicle to move forward. In this manner the vehicle is rapidly propelled, the parallel movement of the runners resulting in a steady forward motion.

I have described in detail the particular construction illustrated in the accompanying drawings for the purpose of clearly disclosing an embodiment of my invention, but it is to be understood that various changes may be made therein without departing from my invention.

I claim:—

1. A motor sleigh, comprising a vehicle body, a driving or power shaft mounted thereon, an oscillatory rear axle operatively connected to said power shaft, runners secured to opposite sides of said axle, connecting means between the axle and each of the runners for causing a parallel motion of the runners without shifting laterally, and rock-levers operatively connected to said power shaft and to said runners.

2. A motor sleigh, comprising a vehicle body, a driving or power shaft mounted thereon, an oscillatory rear axle operatively connected to said power shaft, and runners secured to opposite sides of said axle, and connecting means between the axle and each of the runners for causing a parallel motion of the runners without shifting laterally.

3. A motor sleigh, comprising a vehicle body, a driving or power shaft mounted thereon, a pivotally mounted rear axle, connecting-rods connecting the ends of the axle with cranks on said power shaft, runners pivotally secured to said axle, and means for maintaining a parallel motion of said runners.

4. A motor sleigh, comprising a vehicle body, a driving or power shaft mounted thereon, a pivotally mounted rear axle, connecting-rods connecting the ends of the axle with cranks on said power shaft, runners pivotally secured to said axle, rock-levers having link connections to said cranks and to the inner side of said runners, and means for maintaining a parallel motion of said runners.

5. A motor sleigh, comprising a vehicle body, a driving or power shaft mounted thereon, a pivotally mounted rear axle, connecting-rods connecting the ends of the axle with cranks on said power shaft, runners secured to said axle by link connections permitting a parallel motion thereof, and rock-levers having link connections to said connecting-rods and to the inner side of said runners.

In testimony whereof I affix my signature.

OLAI FLADELAND.

Copies of this patent may be obtained for five cents each, by addressing the "Commissioner of Patents, Washington, D. C."